(12) United States Patent
Kondou

(10) Patent No.: US 8,750,455 B2
(45) Date of Patent: Jun. 10, 2014

(54) RADIATION IMAGE DETECTING DEVICE AND DRIVE CONTROL METHOD THEREOF

(75) Inventor: Kiyoshi Kondou, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 369 days.

(21) Appl. No.: 13/308,090

(22) Filed: Nov. 30, 2011

(65) Prior Publication Data

US 2012/0140892 A1 Jun. 7, 2012

(30) Foreign Application Priority Data

Dec. 1, 2010 (JP) ................................. 2010-268144

(51) Int. Cl.
H05G 1/64 (2006.01)
H04N 5/32 (2006.01)

(52) U.S. Cl.
CPC ..................................... *H04N 5/32* (2013.01)
USPC ....................................................... 378/98.8

(58) Field of Classification Search
CPC ...................................................... H04N 5/32
USPC ........................................... 378/19, 98.8, 62
See application file for complete search history.

(56) References Cited

U.S. PATENT DOCUMENTS

2010/0149391 A1* 6/2010 Kameshima et al. ......... 348/300

FOREIGN PATENT DOCUMENTS

| EP | 0757474 A1 | 2/1997 |
|---|---|---|
| JP | 09321267 A | 12/1997 |
| JP | 11155847 A | 6/1999 |
| JP | 2003126072 A | 5/2003 |
| JP | 2003172783 A | 6/2003 |
| JP | 2005013272 A | 1/2005 |
| JP | 2006263339 A | 10/2006 |
| JP | 2007151761 A | 6/2007 |
| JP | 2008132216 A | 6/2008 |
| JP | 2009219538 A | 10/2009 |
| JP | 2010075677 A | 4/2010 |
| JP | 2010104398 A | 5/2010 |
| JP | 2010-121944 A | 6/2010 |
| JP | 2010124025 A | 6/2010 |
| JP | 2010152279 A | 7/2010 |
| JP | 2010158292 A | 7/2010 |
| JP | 2010212741 A | 9/2010 |

(Continued)

OTHER PUBLICATIONS

Decision of Refusal, Feb. 27, 2013, issued in corresponding JP Application No. 2010-268144, 4 pages in English and Japanese.

(Continued)

*Primary Examiner* — Irakli Kiknadze

(74) *Attorney, Agent, or Firm* — Sughrue Mion, PLLC

(57) ABSTRACT

An FPD is provided with an ammeter for measuring current on a wired connection of a bias line that applies a bias voltage to pixels. A control circuit compares the measured value of the ammeter and a threshold value. When the measured value of the ammeter is equal to or larger than the threshold value, the control circuit judges that an emission of X-rays from an X-ray source is started. Until before the start of the X-ray irradiation is detected, the control circuit stops supplying electric power to a signal processing circuit, and turns on all TFTs. Once the start of the X-ray irradiation is detected, the control circuit turns off all the TFTs, and makes the FPD shift to a charge accumulation operation. Thereafter, the control circuit turns on a processing power source to start supplying the electric power to the signal processing circuit.

9 Claims, 4 Drawing Sheets

(56) References Cited

FOREIGN PATENT DOCUMENTS

| | | |
|---|---|---|
| JP | 2010212925 A | 9/2010 |
| JP | 2010213917 A | 9/2010 |
| JP | 2010214056 A | 9/2010 |
| JP | 2010217141 A | 9/2010 |
| JP | 2010263517 A | 11/2010 |
| JP | 2010268171 A | 11/2010 |
| WO | 2009016909 A1 | 2/2009 |
| WO | 2009075172 A1 | 6/2009 |
| WO | 2010073894 A1 | 7/2010 |
| WO | 2010131506 A1 | 11/2010 |

OTHER PUBLICATIONS

Communication, dated Oct. 9, 2013, issued in corresponding EP Application No. 11190138.5, 7 pages in English.
Notification of Reasons for Refusal, dated Dec. 5, 2012, issued in corresponding JP Application No. 2010-268144, 7 pages in English and Japanese.

* cited by examiner

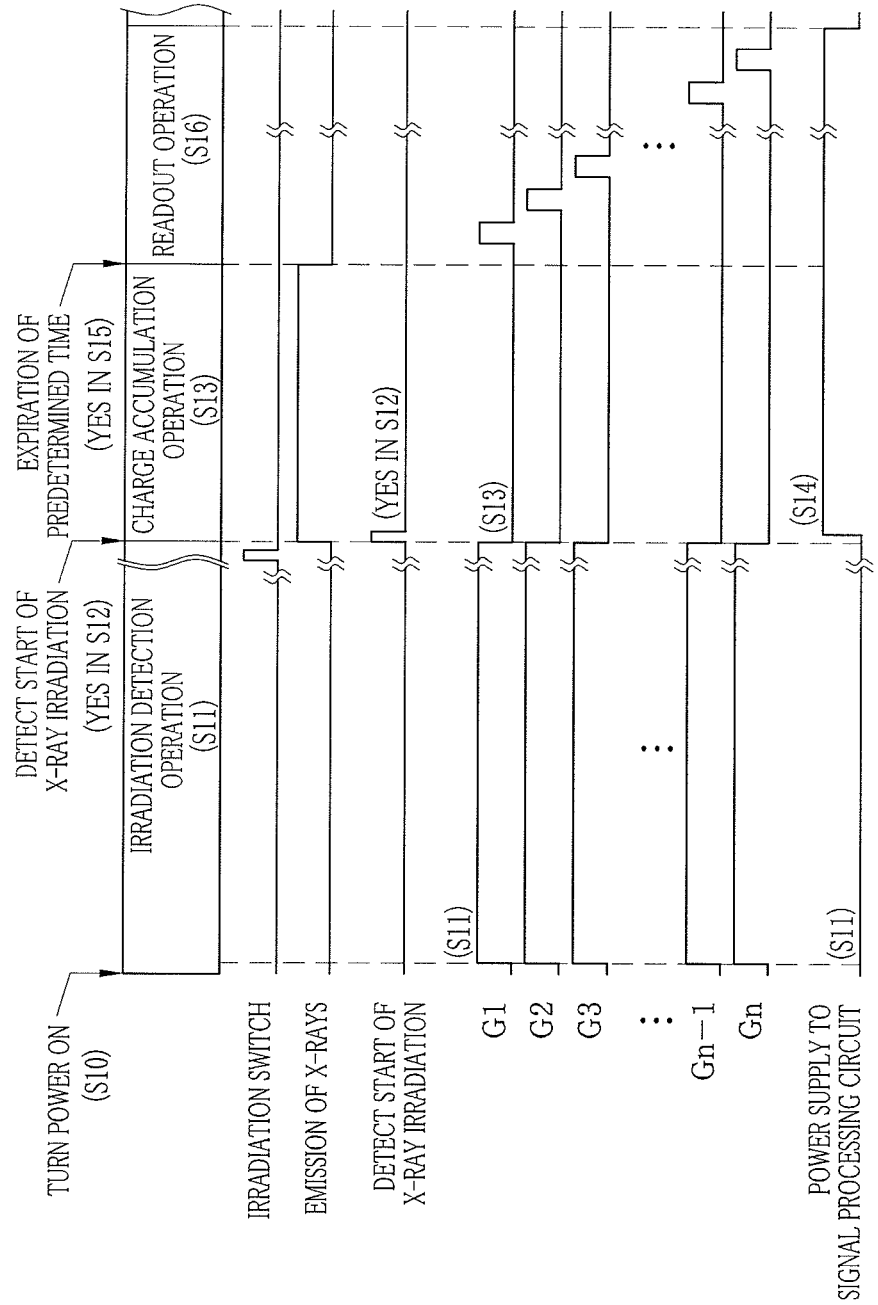

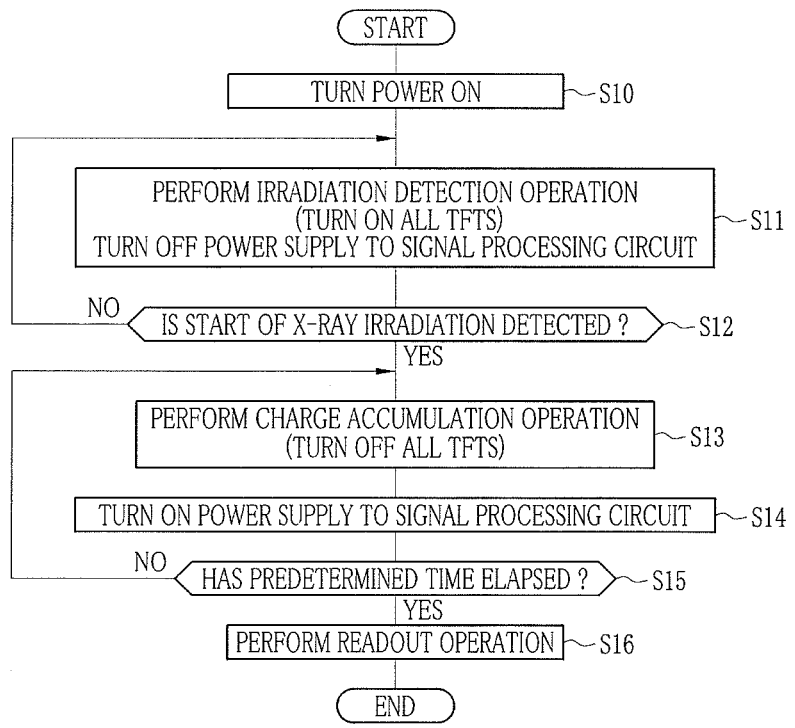
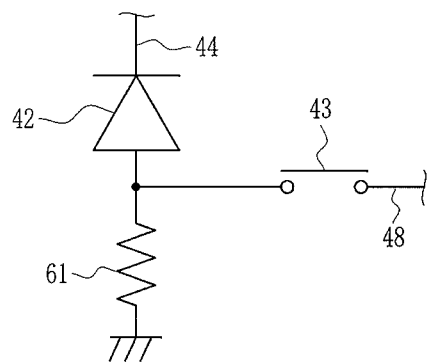

RADIATION IMAGE DETECTING DEVICE AND DRIVE CONTROL METHOD THEREOF

BACKGROUND OF THE INVENTION

1. Field of the Invention

The present invention relates to a radiation image detecting device for detecting a radiation image and a drive control method thereof.

2. Description Related to the Prior Art

A radiation imaging system, e.g. an X-ray imaging system is constituted of an X-ray generation device for generating X-rays and an X-ray imaging device for capturing an X-ray image of a subject. The X-ray generation device has an X-ray source for applying X-rays toward the subject, an X-ray source controller for controlling the drive of the X-ray source, and an irradiation switch for inputting an X-ray irradiation start command. The X-ray imaging device has an X-ray image detecting device for detecting the X-ray image formed from the X-rays which have passed through the subject, and an imaging controller for controlling the drive of the X-ray image detecting device.

The X-ray image detecting devices provided with a flat panel detector (FPD) instead of an X-ray film or an imaging plate (IP) as an X-ray detector have recently been used. Pixels that accumulate signal charge corresponding to an amount of incident X-rays are arranged in a matrix in the FPD. The FPD accumulates the signal charge on a pixel-by-pixel basis, and converts the accumulated signal charge into a voltage signal in a processing circuit, thereby detecting an X-ray image of the subject. The FPD then outputs the X-ray image as digital image data.

Portable X-ray image detecting devices (hereinafter, referred to as the electronic cassette) incorporating the FPD in a rectangular parallelepiped case have also been practically used. The electronic cassette is attached to an imaging support designed for a film cassette or an IP cassette for use. Besides that, the electronic cassette is placed on a bed or held by the subject and used to capture an area which is difficult to capture using a fixed type of X-ray image detecting device. Moreover, the electronic cassette is used outside the hospital where there are no equipments like the imaging support for housebound elderly or people injured in an accident or disaster.

Conventionally, an operation signal generated by the irradiation switch is sent to both the X-ray generation device and the X-ray imaging device as a synchronization signal for indicating a start of X-ray irradiation. Owing to this, timing that the X-rays are emitted from the X-ray source upon depression of the irradiation switch and timing that an operation for accumulating the signal charge by the X-ray image detecting device is started are synchronized. In this case, the X-ray generation device and the X-ray imaging device need to be electrically connected to each other so as to send the synchronization signal. If the manufactures of the X-ray generation device and the X-ray imaging device are different from each other and their connection interfaces (e.g. specification of a cable or connector, format of the synchronization signal) do not comply with each other, appropriate interfaces need to be newly prepared.

To solve the above problem, a technique in which the X-ray image detecting device itself detects the start of the X-ray irradiation without receiving the synchronization signal (without electrically connecting the X-ray generation device and the X-ray imaging device), and is synchronized with the X-ray generation device is proposed (see Japanese Patent Laid-Open Publication No. 2010-121944).

According to the Japanese Patent Laid-Open Publication No. 2010-121944, the start of the X-ray irradiation is detected by monitoring current on a bias line which applies a bias voltage to each pixel in view of that the current corresponding to the electric charge generated in the pixels flows on the bias line. In the Japanese Patent Laid-Open Publication No. 2010-121944, there are provided a sleep mode and an image capture mode. In the sleep mode, electric power is not supplied to the pixels. In the image capture mode, electric power is supplied to the pixels so that images can be captured. The sleep mode is switched to the image capture mode in accordance with a changeover signal from a console or an operation detection signal from the irradiation switch.

After being switched to the image capture mode, the FPD is repeatedly made to perform a readout operation for reading out the signal charge from the pixels. Then, data of frame at which the start of the X-ray irradiation is detected and data of the successive frame added up is eventually outputted as image data.

In a case where the sleep mode is switched to the image capture mode according to the switchover signal from the console, and the FPD is repeatedly made to perform the readout operation like the case of the Japanese Patent Laid-Open Publication No. 2010-121944, the readout operation before detecting the start of the X-ray irradiation is wasted and the power consumption for the wasted operation runs up. If a battery is loaded on the electronic cassette and the communication with the imaging controller is made wirelessly, the increase of the power consumption may lead frequent battery exchange, which is troublesome.

In a case where the mode is switched according to the operation detection signal from the irradiation switch, the X-ray generation device and the X-ray imaging device need to be electrically connected, which is fundamentally contradicted to the configuration in which the start of the X-ray irradiation is detected by the X-ray image detecting device itself.

SUMMARY OF THE INVENTION

An object of the present invention is to provide a radiation image detecting device that can achieve electric power saving, and a drive control method of the radiation image detecting device.

To achieve the above and other objects, a radiation image detecting device according to the present invention includes a plurality of pixels, a plurality of switching elements, a signal processing circuit, an irradiation detector, and a controller.

The pixels are arranged in two dimensions, and each of the pixels accumulates signal charge corresponding to an amount of radiation from a radiation source. Each of the switching elements is provided to correspond to each pixel, and makes the corresponding pixel perform a charge accumulation operation of the signal charge and a readout operation of the signal charge. The signal processing circuit converts the signal charge read out from the pixels into an electric signal and outputs the electric signal. The irradiation detector detects whether irradiation of the radiation is started or not based on an electrical change on at least one of the pixels. The controller stops supplying electric power to the signal processing circuit until before the start of the radiation irradiation is detected by the irradiation detector and starts supplying the electric power to the signal processing circuit when the start of the radiation irradiation is detected by the irradiation detector.

Until before the start of the radiation irradiation is detected by the irradiation detector, the controller turns on all of the switching elements. When the start of the radiation irradiation is detected by the irradiation detector, the controller turns off all of the switching elements to be shifted to the charge accumulation operation. After turning off all of the switching elements, the controller starts supplying the electric power to the signal processing circuit.

The irradiation detector detects the start of the radiation irradiation based on a change in a measurement value of current on a bias line that applies a bias voltage to pixels. Alternatively, the irradiation detector detects the start of the radiation irradiation based on leak charge leaking from the pixels.

The radiation image detecting device may further include a communication section that exchanges information with external devices. The communication section is not supplied with the electric power until before the start of the radiation irradiation is detected, whereas the communication section is supplied with the electric power when the radiation irradiation is detected.

The radiation image detecting device may further include a battery for supplying the electric power to each component. In this case, the communication section exchanges the information with the external devices wirelessly.

It is preferable that the radiation image detecting device is an electronic cassette having the plurality of pixels, the plurality of switching elements, the signal processing circuit, the irradiation detector, and the controller contained in a portable case.

A drive control method of a radiation image detecting device according to the present invention includes the steps of detecting whether irradiation of radiation is started or not based on an electrical change on pixels each of which accumulating signal charge corresponding to an amount of the radiation from a radiation source; stopping supplying electric power to a signal processing circuit, which converts signal charge read out from the pixels into an electric signal and outputs the electric signal, until before the start of the radiation irradiation is detected; and starting supplying the electric power to the signal processing circuit when the start of the radiation irradiation is detected.

According to the present invention, the start of the radiation irradiation is detected based on the electrical change on the pixels. The electric power is not supplied to the signal processing circuit until before the start of the radiation irradiation is detected, whereas the electric power is supplied to the signal processing circuit when the start of the radiation irradiation is detected. Owing to this, the electric power saving can be achieved.

BRIEF DESCRIPTION OF THE DRAWINGS

For more complete understanding of the present invention, and the advantage thereof, reference is now made to the following descriptions taken in conjunction with the accompanying drawings, in which:

FIG. 3 is a timing chart illustrating operation procedures of an electronic cassette;

FIG. 4 is a flow chart illustrating the operation procedures of the electronic cassette; and FIG. 5 is a schematic view illustrating an example of a circuit in a case where the start of X-ray irradiation is detected based on leak charge.

DESCRIPTION OF THE PREFERRED EMBODIMENTS

Figure 1:
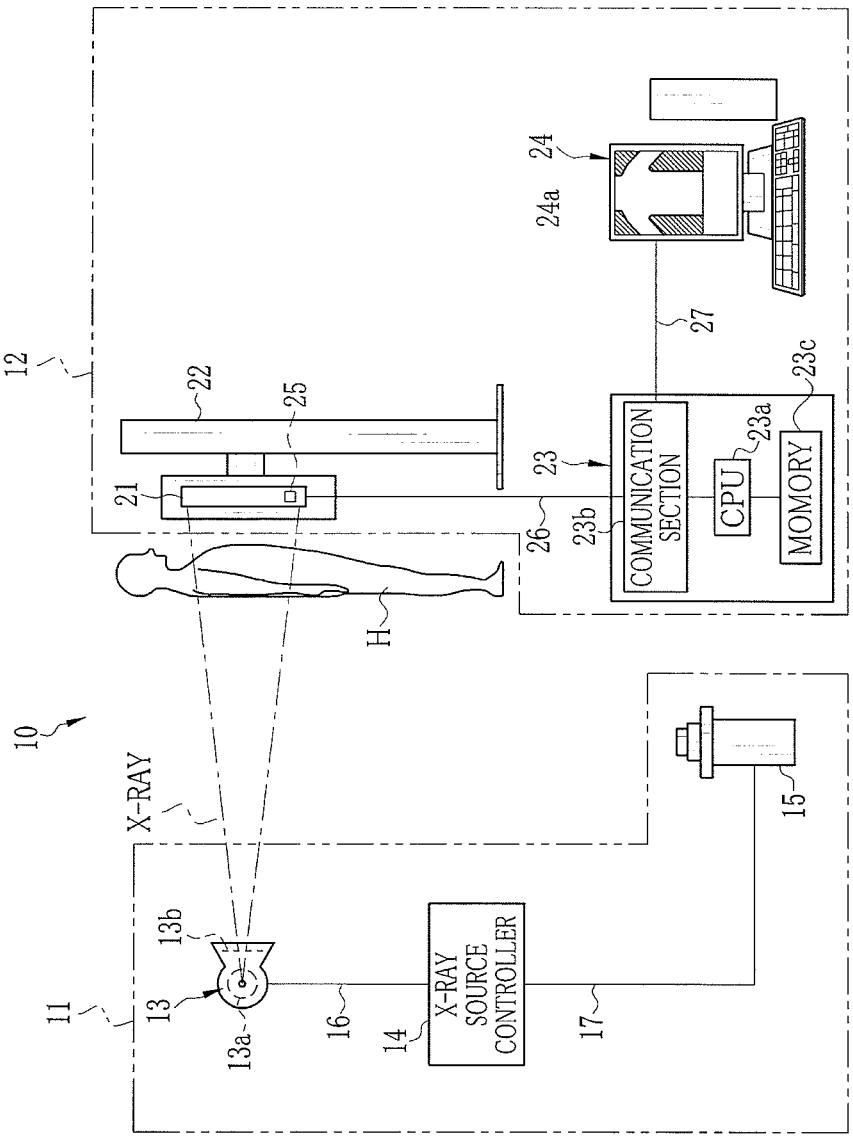
FIG. 1 is a schematic view illustrating a structure of an X-ray imaging system.

In FIG. 1, an X-ray imaging system 10 is constituted of an X-ray generation device 11 and an X-ray imaging device 12. The X-ray generation device 11 includes an X-ray source 13, an X-ray source controller 14 for controlling the drive of the X-ray source 13, and an irradiation switch 15. The X-ray source 13 has an X-ray tube 13a for emitting X-rays, and a collimator 13b for limiting an irradiation field of the X-rays emitted from the X-ray tube 13a.

The X-ray tube 13a has a cathode and an anode. The cathode is composed of a filament for emitting thermoelectrons. The thermoelectrons emitted from the cathode collide against the anode (target), and thereby emitting the X-rays. The target having a disc shape is a rotating anode in which a focus point moves along a circumferential orbit by its rotation, and thereby dispersing the heat at the focus point where the thermoelectrons make the collision. The collimator 13b has a plurality of lead plates arranged such that they orthogonally cross with each other, and thereby forming an irradiation opening at the center for transmitting the X-rays therethrough. The size of the irradiation opening is changed by moving the positions of the lead plates, and thus the irradiation field can be regulated.

The X-ray source controller 14 is constituted of a high voltage generator and a controller. The high voltage generator applies a high voltage to the X-ray source 13. The controller controls tube voltage for determining an energy spectrum of the X-rays emitted from the X-ray source 13, tube current for determining an irradiation amount of the X-rays per unit time, and irradiation time of the X-rays. The high voltage generator multiplies the inputted voltage by a transformer to generate the high tube voltage, thereby supplying drive electric power to the X-ray source 13 through a high voltage cable 16. The X-ray generation device 11 in this embodiment does not have the function to communicate with the X-ray imaging device 12, and imaging conditions such as the tube voltage, the tube current, and the irradiation time of the X-rays are manually set using an operation panel of the X-ray source controller 14 by a radiation technologist (operator).

The irradiation switch 15 manipulated by the operator is connected to the X-ray source controller 14 through a signal cable 17. The irradiation switch 15 is a two-step push switch that generates a warm-up start signal for making the X-ray source 13 start warming up by a first-step push and generates an X-ray irradiation start signal for making the X-ray source 13 start emitting the X-rays by a second-step push. These signals are inputted to the X-ray source controller 14 through the signal cable 17.

The X-ray source controller 14 controls the operation of the X-ray source 13 based on the control signals from the irradiation switch 15. Upon reception of the warm-up start signal, the X-ray source controller 14 activates a heater to pre-heat the filament, and in addition makes the target start rotating to reach a desired rotational speed. Time required for the warm-up is approximately 200 msec to 1500 msec. After inputting a warm-up start command by the first-step push of the irradiation switch 15, the operator gives enough time for the warm-up, and then inputs an X-ray irradiation start command by the second-step push of the irradiation switch 15.

Upon reception of the X-ray irradiation start signal, the X-ray source controller 14 starts supplying the electric power to the X-ray source 13, and also activates a timer to start measuring the irradiation time of the X-rays. After a lapse of the irradiation time which is one of the imaging conditions, the X-ray source controller 14 stops the irradiation of the X-rays. Although the irradiation time of the X-rays varies depending on the imaging status, a maximum irradiation time when capturing static radiographic images is often set within a range of approximately 500 msec to approximately 2 sec. The irradiation time is set up to this maximum irradiation time.

The X-ray imaging device 12 is constituted of an electronic cassette 21, an imaging support 22, an imaging controller 23, and a console 24. The electronic cassette 21 includes a FPD 36 (see FIG. 2) and a portable case for containing the FPD 36. Upon reception of the X-rays that have emitted from the X-ray source 13 and passed through a subject (patient) H, the electronic cassette 21 outputs an X-ray image. The electronic cassette 21 has approximately rectangular and flat shape, and its surface is approximately the same as the film cassette or the IP cassette.

The imaging support 22 has a slot into which the electronic cassette 21 is detachably attached. The imaging support 22 holds the electronic cassette 21 such that its incident surface on which the X-rays enter oppose to the X-ray source 13. Since the size of the case of the electronic cassette 21 is approximately same as that of the film cassette or the IP cassette, the electronic cassette 21 can also be attached to the imaging support designed for the film cassette or the IP cassette. Note that although an upright-posture imaging support for capturing the standing subject H is exemplified as the imaging support 22, a horizontal imaging support for capturing the subject H lying down is also applicable.

Figure 2:
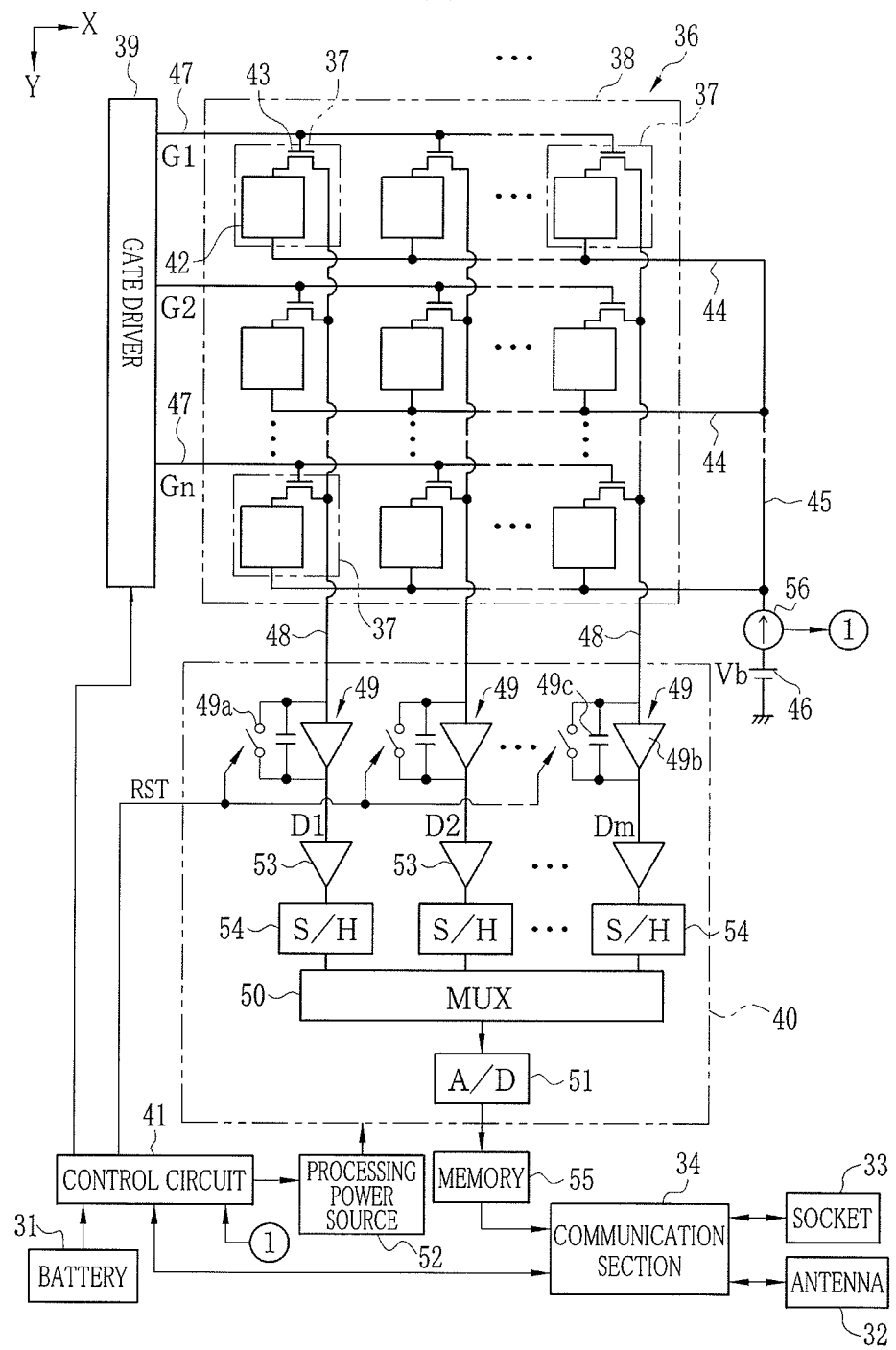
FIG. 2 is a schematic view illustrating an electrical structure of an FPD.

In FIG. 2, the electronic cassette 21 contains a battery 31 and an antenna 32, and is capable of communicating with the imaging controller 23 wirelessly. The battery 31 supplies the electric power to operate each component of the electronic cassette 21. As the battery 31, a relatively small battery is used so that it can be contained in the thin electronic cassette 21. The battery 31 can be detached from the electronic cassette 21 to be recharged. The antenna 32 sends and receives radio waves with the imaging controller 23 for the wireless communication.

In addition to the antenna 32, a socket 33 is provided to the electronic cassette 21. The socket 33 is provided to connect the electronic cassette 21 with the imaging controller 23 by wire, and a connector of a communication cable 26 (see FIG. 1) linked to the imaging controller 23 is inserted into the socket 33. The communication cable 26 is used when the electronic cassette 21 is incapable of the wireless communication with the imaging controller 23 for the reason that the battery 31 is low, or the like. The usage of the communication cable 26 enables not only the wire communication between the electronic cassette 21 and the imaging controller 23 but also the electric power supply from the imaging controller 23 to the electronic cassette 21.

The antenna 32 and the socket 33 are connected to a communication section 34. The communication section 34 intermediates sending and receiving of a variety of information including image data and signals between the antenna 32 or the socket 33 and a control circuit 41 or a memory 55.

The FPD 36 is provided with an imaging field 38, a gate driver 39, a signal processing circuit 40, and the control circuit 41 that are formed on a TFT active matrix substrate. A plurality of pixels 37 each of which accumulates signal charge corresponding to an amount of incident X-rays is arranged in two dimensions on this substrate, and thereby forming the imaging field 38. The gate driver 39 controls readout of the signal charge by driving the pixels 37. The signal processing circuit 40 converts the signal charge read out from the pixels 37 into digital data to output. The control circuit 41 controls the operation of the FPD 36 by controlling the gate driver 39 and the signal processing circuit 40. The pixels 37 are arranged in a matrix along n rows (x direction) and m columns (y direction) at a predetermined pitch.

The FPD 36 has a scintillator (phosphor) for converting the X-rays into visible light. The FPD 36 is of an indirect conversion type in which the visible light converted by the scintillator is photoelectrically converted into the electric charge in the pixels 37. The scintillator is disposed oppositely to a whole surface of the imaging field 38 on which the pixels 37 are arranged. Note that an FPD of a direct conversion type using a conversion layer (amorphous selenium or the like) for converting the X-rays directly into the electric charge is also applicable.

Each pixel 37 is provided with a photodiode 42, a capacitor (not shown), and a thin film transistor (TFT) 43 as a switching element. The photodiode 42 is a photoelectric conversion element for generating the electric charge (electron-hole pair) owing to the entrance of the visible light. The capacitor accumulates the electric charge generated by the photodiode 42.

The photodiode 42 has a structure in which an upper electrode is disposed on top of a semiconductor layer (for example PIN type) for generating the electric charge and a lower electrode is disposed below the semiconductor layer. The lower electrode of the photodiode 42 is connected to the TFTs 43 and the upper electrode of the photodiode 42 is connected to bias lines 44. The bias line 44 is prepared for each row (for the number of n rows) of the pixels 37 in the imaging field 38 and tied to a wired connection 45. The wired connection 45 is connected to a bias supply 46. A bias voltage Vb is applied from the bias supply 46 to the upper electrode of the photodiode 42 through the wired connection 45 and the bias lines 44. Owing to the application of the bias voltage Vb, an electric field is generated in the semiconductor layer. Thus, among the electric charge (electron-hole pair) generated in the semiconductor layer owing to the photoelectric conversion, the negative electrons move to one of the upper and lower electrodes having positive polarity, and the positive holes move to the other of the upper and lower electrodes having negative polarity, and thereby the electric charge is accumulated in the capacitor.

A gate electrode of the TFT 43 is connected to a scan line 47, a source electrode of the TFT 43 is connected to the signal line 48, and a drain electrode of the TFT 43 is connected to the photodiode 42. The scan lines 47 and the signal lines 48 are arranged to orthogonally cross with one another. The scan line 47 is prepared for each row of the pixels 37 in the imaging field 38 (the number of the scan lines 47 corresponds to the number of n rows), and the signal line 48 is prepared for each column of the pixels 37 in the imaging field 38 (the number of the signal lines 48 corresponds to the number of m columns). The scan lines 47 are connected to the gate driver 39, and the signal lines 48 are connected to the signal processing circuit 40.

By driving the TFTs 43, the gate driver 39 makes the FPD 36 perform a charge accumulation operation for accumulating the signal charge corresponding to the incident amount of the X-rays in the pixels 37, a readout (real reading) operation for reading out the signal charge from the pixels 37, a pixel reset (dummy reading) operation, and an irradiation detection operation. The control circuit 41 controls start timing of each of these operations by the gate driver 39.

In the charge accumulation operation, the TFTs 43 are turned off, and the signal charge is accumulated in the pixels 37 during that time. In the readout operation, gate pulses G1 to Gn each of which drives the TFTs 43 along the same row all at once, that is on a row-by-row basis, are successively generated by the gate driver 39 to sequentially activate the scan lines 47 on a row-by-row basis, and thereby turning on the TFTs 43 connected to the activated scan line 47 on a row-by-row basis. The electric charge accumulated in the capacitor is readout to the signal lines 48 when the TFTs 43 are turned on, and is inputted to the signal processing circuit 40.

In the semiconductor layer of the photodiode 42, dark charge is generated regardless of existence of the incident X-rays. Since the bias voltage Vb is applied to the dark charge, the dark charge is accumulated in the capacitor. The dark charge generated in the pixels 37 become noise components for the image data, and therefore the pixel reset operation for removing the dark charge is performed. In the pixel reset operation, the dark charge generated in the pixels 37 is swept out through the signal lines 48.

The pixel reset operation is performed in, for example, a sequential reset method in which the pixels 37 are sequentially reset on a row-by-row basis. In the sequential reset method, like the readout operation of the signal charge, the gate pulses G1 to Gn are successively generated by the gate driver 39 to the scan lines 47, and thereby turning on the TFTs 43 of the pixels 37 on a row-by-row basis. While the TFTs 43 of one row is turned on, the dark charge flows from the pixels 37 to an integration amplifier 49 through the signal lines 48. In the pixel reset operation, unlike the readout operation, readout of the electric charge accumulated in a capacitor 49c of the integration amplifier 49 by a multiplexer (MUX) 50 is not performed. Then, a reset switch 49a is turned on by a reset pulse RST from the control circuit 41, and the capacitor 49c is discharged, thereby resetting the integration amplifier 49.

Instead of the sequential reset method, a parallel reset method or an all-pixel reset method is also applicable. In the parallel reset method, two or more rows of the arranged pixels are defined as one group, and the pixels arranged on the same row in each group are simultaneously reset, and thereby sweeping out the dark charge of two or more rows at once. In the all-pixel reset method, the gate pulses are sent to all rows, and the dark charge of all pixels is simultaneously swept out. The parallel reset method and the all-pixel reset method can speed up the pixel reset operation.

The signal processing circuit 40 is provided with the integration amplifier 49, the MUX 50, an A/D converter 51, and the like, and the drive electric power is supplied to the signal processing circuit 40 from a processing power source 52. The integration amplifier 49 is individually connected to each signal line 48. The integration amplifier 49 is constituted of the reset switch 49a, an operational amplifier 49b, and the capacitor 49c, and the signal line 48 is connected to one input terminal of the operational amplifier 49b. The other input terminal of the operational amplifier 49b is connected to ground (GND). The integration amplifiers 49 integrate the electric charge inputted through the signal lines 48, and convert the electric charge into voltage signals D1 to Dm to output. The output terminal of the operational amplifier 49b of each column is connected to the MUX 50 through an amplifier 53 and a sample and hold (S/H) section 54.

The MUX 50 sequentially selects one integration amplifier 49 from among the integration amplifiers 49 connected in parallel, and serially inputs the voltage signals D1 to Dm outputted from the selected integration amplifiers 49 to the A/D converter 51. The A/D converter 51 converts the inputted voltage signals D1 to Dm into digital data, and outputs the digital data to the memory 55 contained in the case of the electronic cassette 21. Note that an amplifier can be connected between the MUX 50 and the A/D converted 51.

When the voltage signals D1 to Dm of one row are read out from the integration amplifiers 49 by the MUX 50, the control circuit 41 outputs the reset pulse RST to the integration amplifiers 49, and thereby turning on the reset switches 49a of the integration amplifiers 49. Owing to this, the signal charge of one row accumulated in the integration amplifiers 49 is reset. Once the integration amplifiers 49 are rest, the gate pulse of the next row is outputted from the gate driver 39, and thereby starting the readout of the signal charge from the pixels 37 of the next row. The above-described operation is sequentially repeated, and thereby reading out the signal charge from the pixels 37 of all rows.

When the readout of all rows is completed, image data representing an X-ray image of a single frame is recorded in the memory 55. The image data is read out from the memory 55, and outputted to the imaging controller 23 through the communication section 34. In this way, the X-ray image of the subject H is detected.

In the irradiation detection operation, the processing power source 52 is turned off (the electric power is not supplied to the signal processing circuit 40), and the gate pulses G1 to Gn are generated from the gate driver 39 toward the scan lines 47 all at once, and thereby turning on all of the TFTs 43. During this time, bias current that is measured by an ammeter 56 is compared with a threshold value, and the start of the X-ray irradiation is judged from the comparison result.

The ammeter 56 is connected to the wired connection 45, and measures the bias current flowing on the wired connection 45 during the irradiation detection operation. The ammeter 56 outputs the measurement result to the control circuit 41. The ammeter 56 is constituted of a resistance connected in series to, for example, the wired connection 45, and a difference amplifier for measuring voltages between both terminals of the resistance. By measuring the voltages between both terminals of the resistance using the difference amplifier, the bias current flowing on the wired connection 45 is converted into a voltage value to be detected. The ammeter 56 outputs the detected voltage value to the control circuit 41.

The control circuit 41 compares which one is larger or smaller than the other between the measured value (bias current) inputted from the ammeter 56 and the predetermined threshold value. When the measured value is smaller than the threshold value, the control circuit 41 judges that the X-rays have not emitted yet from the X-ray source 13 and makes the FPD 36 continue the irradiation detection operation. On the other hand, when the measured value is equal to or larger than the threshold value, the control circuit 41 judges that the irradiation of the X-rays by the X-ray source 13 is started.

Among the electric charge (electron-hole pair) generated in the pixels 37, the electric charge not accumulated in the capacitor (the positive holes in this embodiment) leak to the bias lines 44 and flow toward the bias supply 46 through the wired connection 45. This change in the value of current is measured by the ammeter 56.

When the X-rays are not emitted, only the dark charge is generated in the pixels 37, and therefore the measured value (bias current) of the ammeter 56 is substantially below the threshold value. On the other hand, when the X-rays are emitted, the signal charge corresponding to the X-ray irradiation is generated in the pixels 37. Since the signal charge is much larger than the dark charge, the bias current rises rapidly. Thus, the measured value of the ammeter 56 becomes equal to or larger than the threshold value right after the emission of the X-rays. The control circuit 41 monitors an electrical change on at least one pixel 37, for example, the change in the value of bias current before and after the start of the X-ray irradiation, and thereby detecting the start of the X-ray irradiation.

After the electronic cassette 21 has been turned on, the control circuit 41 immediately turns on all of the TFTs 43 and makes the FPD 36 shift to the irradiation detection operation. When the start of the X-ray irradiation is detected during the irradiation detection operation, the control circuit 41 makes the FPD 36 shift from the irradiation detection operation to the charge accumulation operation. The control circuit 41 starts measuring time elapsed from the start of the charge accumulation operation using the timer. After a lapse of the time set in the imaging conditions, the control circuit 41 makes the FPD 36 shift from the charge accumulation operation to the readout operation.

When the electronic cassette 21 is turned on and the irradiation detection operation is performed, the control circuit 41 turns off the processing power source 52 to stop supplying the electric power to the signal processing circuit 40. Only after the start of the X-ray irradiation is detected and the FPD 36 is shifted to the charge accumulation operation, the control circuit 40 starts supplying the electric power from the processing power source 52 to the signal processing circuit 40.

The imaging controller 23 is connected to the electronic cassette 21 through the communication cable 26 or wirelessly, and controls the electronic cassette 21. Specifically, the imaging controller 23 sends the imaging conditions to the electronic cassette 21, and indirectly controls each of the above-described operations of the FPD 36 as well as setting up conditions (gain of the amplifier 53 or the like) for the signal processing by the FPD 36. In addition, the imaging controller 23 sends the image data from the electronic cassette 21 to the console 24.

In FIG. 1, the imaging controller 23 includes a CPU 23a, a communicator 23b, and a memory 23c. The CPU 23a takes overall control of the imaging controller 23. The communicator 23b communicates with the console 24 through a communication cable 27 as well as communicating with the electronic cassette 21 by wire or wirelessly. The communicator 23b and the memory 23c are connected to the CPU 23a. In the memory 23c, control programs executed by the CPU 23a is stored. In addition, a variety of information such as the threshold value compared with the measured value of the ammeter 56 is stored in the memory 23c. The console 24 sends the imaging conditions to the imaging controller 23, and also applies a variety of image processing such as offset correction and gain correction to the data of the X-ray image sent from the imaging controller 23. The X-ray image which has been subjected to the image processing is displayed on a monitor 24a of the console 24, and data thereof is stored in a hard disk or a memory of the console 24, or data storage devices like an image storage server connected to the console 24 through a network.

Upon reception of input of an examination order including information such as sex and age of a patient, a site to be captured, and a purpose of the examination, the console 24 displays the examination order on the monitor 24a. The examination order is inputted from an external system such as a hospital information system (HIS) or a radiation information system (RIS) that controls examination information related to radiation examination and patient information. Alternatively, the examination order is manually inputted by the operator. The operator checks the contents of the examination order on the monitor 24a, and inputs the imaging conditions according to the contents through the monitor 24a of the console 24.

Hereinafter, the operation of the X-ray imaging system 10 according to the above-described configuration will be explained with reference to a timing chart of FIG. 3 and a flow chart of FIG. 4. Note that reference numerals S10 to S16 in FIGS. 3 and 4 correspond with each other.

When radiography is performed using the X-ray imaging system 10, the height of the electronic cassette 21 set in the imaging support 22 is adjusted to the position of the site to be captured of the subject H. In addition, the height of the X-ray source 13 and the size of the X-ray irradiation field are adjusted according to the height of the electronic cassette 21 and the size of the site to be captured.

Next, as shown in a step S10 of FIG. 4, when the electronic cassette 21 is turned on, the electric power is supplied from the battery 31 to the electronic cassette 21. Owing to this, the bias voltage Vb is applied from the bias supply 46 to the pixels 37 of the FPD 36, and the gate driver 39 is activated. Meanwhile, the processing power source 52 is turned off, and the operation of the signal processing circuit 40 is stopped (S11). After the electronic cassette 21 is turned on, all of the TFTs 43 are turned on by the gate driver 39, and the FPD 36 starts the irradiation detection operation (S11). Then, the imaging conditions are set up in the electronic cassette 21 via the imaging controller 23 by inputting the imaging conditions from the console 24. The imaging conditions are also set up in the X-ray source controller 14.

When the preparation for radiography is completed, the first-step push is inputted to the irradiation switch 15 by the operator. Owing to this, the warm-up start signal is sent to the X-ray source controller 14, and thereby starting the warm-up of the X-ray source 13. After a lapse of the predetermined time, the second-step push is inputted to the irradiation switch 15.

Owing to this, the X-ray irradiation start command is sent to the X-ray source controller 14, and thereby starting the irradiation of the X-rays.

In the FPD 36, the irradiation detection operation is executed, and the control circuit 41 detects whether the irradiation of the X-rays is started or not based on the measured value of the ammeter 56. The measured value of the ammeter 56 is inputted to the control circuit 41 and compared with the threshold value, and thereby detecting whether the irradiation of the X-rays is started or not.

When the start of the X-ray irradiation is detected with the measured value of the ammeter 56 being equal to or larger than the threshold value (YES in S12), the control circuit 41 turns off all the TFTs 43 and makes the FPD 36 shift to the charge accumulation operation (S13). In addition, the processing power source 52 is turned on, thereby supplying the electric power to the signal processing circuit 40 (S14).

After a lapse of the emission time set in the imaging conditions, the X-ray source controller 14 stops the irradiation of the X-rays. After a lapse of the predetermined time corresponding to the irradiation time of X-rays set in the imaging conditions (YES in S15), the FPD 36 stops the charge accumulation operation and shifts to the readout operation (S16). In the readout operation, the signal charge accumulated in the pixels 37 of each row is sequentially read out from a first row, and the read signal charge is recorded as the X-ray image data of a single frame in the memory 55. The image data is sent to the console 24 via the imaging controller 23. After the readout operation, the FPD 36 returns to the step S11 and start the irradiation detection operation again.

The image data in the memory 55 is sent to the console 24 via the imaging controller 23. After various types of image processing such as offset correction and gain correction are applied to the image data, the processed image data is displayed on the monitor 24a of the console 24 or stored in the data storage device.

As explained above, according to the present invention, the start of the X-ray irradiation is detected by monitoring the bias current. After the start of the X-ray irradiation is detected, the FPD 36 shifts to the charge accumulation operation, and then the readout operation is executed by starting the power supply to the signal processing circuit 40. Owing to this, radiography can be performed without making the FPD 36 perform useless operation, which brings an advantage of achieving power saving.

Owing to the achievement of power saving, the size of the battery 31 contained in the electronic cassette 21 is further reduced. Moreover, since the start of the X-ray irradiation can be detected by merely connecting the ammeter 56 to the existing wired connection 45 without using a special sensor, the portability of the electronic cassette 21 is enhanced.

Since there is no need to send the operation signal from the irradiation switch 15 by electrically connecting the X-ray generation device 11 and the X-ray imaging device 12, the present invention is applicable in a case where the X-ray generation device 11 and the X-ray imaging device 12 are manufactured by different makers and their connection interfaces do no comply with each other.

In the above embodiment, all of the TFTs 43 are turned on during the irradiation detection operation, and the start of the X-ray irradiation is detected based on the measured value (bias current) of the ammeter 56. Instead of this, it is also possible to detect the start of the X-ray irradiation based on leak charge leaking from the pixels 37 when all of the TFTs 43 are turned off.

In this case, as shown in FIG. 5, a load resistance 61 is connected to the photodiode 42 of each pixel 37. After the electronic cassette 21 is turned on, unlike the above embodiment, all of the TFTs 43 are turned off, and the irradiation detection operation is executed, thereby measuring leak current of the leak charge using the ammeter 56. When the measured value of the leak current is equal to or larger than the threshold value, it is judged that the start of the X-ray irradiation is detected. Upon detection of the start of the X-ray irradiation, the electric power supply to the signal processing circuit 40 is started. For this configuration, the control of switching the TFTs 43 from ON to OFF, which is required in the above embodiment, becomes unnecessary.

The processing applied to the signal processing circuit 40 in the above embodiment can be applied to the communication section 34 in the same manner. Specifically, the electric power supply to the communication section 34 is stopped until before the start of the X-ray irradiation is detected, and the electric power supply to the communication section 34 is started when the start of the X-ray irradiation is detected.

Some electronic cassettes, such as the electronic cassette used only for the static radiographic image capturing in which the imaging conditions are not changed, do not need to receive information like the imaging conditions from the imaging controller 23 before radiography. In such electronic cassettes, there is no harm in stopping the electric power supply to the communication section 34. With use of such types of electronic cassette, further power saving can be achieved.

The X-ray imaging system 10 is applicable not only to a type installed in a radiography room of the hospital, but also to a type installed in a vehicle or a portable type in which the X-ray source 13, the X-ray source controller 14, the electronic cassette 21, the imaging controller 23, and the like are carried into an accident or disaster scene requiring emergency medical treatment, or to the patient's home receiving home care for radiography.

There are several types of X-ray sources that eliminate the need for the warm-up, such as a fixed anode type having a non-rotating anode, a cold cathode type being in no need of preheating. Thus, the irradiation switch may only have the function of issuing the X-ray irradiation start signal. Even in the case of the X-ray source requiring the warm-up, the irradiation switch inputs the X-ray irradiation start signal to the source controller, and the source controller may start the warm-up in response to the irradiation start signal. After the completion of the warm-up, the X-ray irradiation may be started. In this case, the irradiation switch does not need to have the function of generating the warm-up start signal.

In the above embodiment, the electronic cassette and the imaging controller are configured separately, but the electronic cassette and the imaging controller may be integrated by, for example, providing the function of the imaging controller to the control section of the electronic cassette. In addition, the imaging controller may perform the image processing instead of the console.

In the above embodiment, the present invention is applied to the electronic cassette being a portable X-ray image detecting device, but may be applied to a fixed X-ray image detecting device.

The present invention is applicable to an imaging system using another type of radiation such as y-rays, in addition to the X-rays.

Although the present invention has been fully described by the way of the preferred embodiment thereof with reference to the accompanying drawings, various changes and modifications will be apparent to those having skill in this field. Therefore, unless otherwise these changes and modifications depart from the scope of the present invention, they should be construed as included therein.

What is claimed is:

1. A radiation image detecting device, comprising:
a plurality of pixels arranged in two dimensions, each of said pixels accumulating signal charge corresponding to an amount of radiation from a radiation source;
a plurality of switching elements each of which is provided to correspond to each of said pixels, each of said switching element making the corresponding pixel perform a charge accumulation operation of said signal charge and a readout operation of said signal charge;
a signal processing circuit for converting said signal charge read out from said pixels into an electric signal and outputting said electric signal;
an irradiation detector for detecting whether irradiation of said radiation is started or not based on an electrical change on said pixels; and
a controller that stops supplying electric power to said signal processing circuit until before the start of the radiation irradiation is detected by said irradiation detector and starts supplying the electric power to said signal processing circuit when the start of the radiation irradiation is detected by said irradiation detector.

2. The radiation image detecting device according to claim 1, wherein said controller turns on all of said switching elements until before the irradiation of the radiation is detected by said irradiation detector, and turns off all of said switching elements to be shifted to said charge accumulation operation when the irradiation of the radiation is detected by said irradiation detector, said controller starting supplying the electric power to said signal processing circuit after turning off all of said switching elements.

3. The radiation image detecting device according to claim 1, wherein said irradiation detector detects the start of the radiation irradiation based on a change in a measurement value of current on a bias line that applies a bias voltage to said pixels.

4. The radiation image detecting device according to claim 1, wherein said irradiation detector detects the start of the radiation irradiation based on leak charge leaking from said pixels.

5. The radiation image detecting device according to claim 1, further comprising a communication section that exchanges information with external devices, said communication section being not supplied with the electric power until before the start of the radiation irradiation is detected, said communication section being supplied with the electric power when the radiation irradiation is detected.

6. The radiation image detecting device according to claim 5, further comprising a battery for supplying the electric power to each component.

7. The radiation image detecting device according to claim 6, wherein said communication section exchanges said information with said external devices wirelessly.

8. The radiation image detecting device according to claim 1 being an electronic cassette having said plurality of pixels, said plurality of switching elements, said signal processing circuit, said irradiation detector, and said controller contained in a portable case.

9. A drive control method of a radiation image detecting device, comprising the steps of:
- detecting whether irradiation of radiation is started or not based on an electrical change on pixels each of which accumulating signal charge corresponding to an amount of said radiation from a radiation source;
- stopping supplying electric power to a signal processing circuit until before the start of the radiation irradiation is detected, said signal processing circuit converting signal charge read out from said pixels into an electric signal and outputting said electric signal; and
- starting supplying the electric power to said signal processing circuit when the start of the radiation irradiation is detected.

* * * * *